US012710231B2

(12) United States Patent
Na et al.

(10) Patent No.: US 12,710,231 B2
(45) Date of Patent: Aug. 18, 2026

(54) INTEGRATION CHAMBER FOR MIXING BOOTH DISCHARGE GAS AND OVEN DISCHARGE GAS AND VOC REMOVAL SYSTEM UTILIZING THE SAME

(71) Applicants: Hyundai Motor Company, Seoul (KR); Kia Corporation, Seoul (KR); SANGWONE E&I CO., LTD., Gimpo-si (KR)

(72) Inventors: Sungyub Na, Ulsan (KR); Wootae Lim, Hwaseong-si (KR); Kwangshin Hwang, Gimpo-si (KR); Sangkun Han, Incheon (KR); Leerang Kim, Gimpo-si (KR); Hami Lee, Incheon (KR)

(73) Assignees: Hyundai Motor Company, Seoul (KR); Kia Corporation, Seoul (KR); Sangwone E&I Co., Ltd., Gimpo-Si (KR)

( * ) Notice: Subject to any disclaimer, the term of this patent is extended or adjusted under 35 U.S.C. 154(b) by 763 days.

(21) Appl. No.: 17/988,358

(22) Filed: Nov. 16, 2022

(65) Prior Publication Data

US 2023/0324120 A1 Oct. 12, 2023

(30) Foreign Application Priority Data

Apr. 6, 2022 (KR) ........................ 10-2022-0042993

(51) Int. Cl.

| | |
|---|---|
| ***F26B 21/30*** | (2026.01) |
| ***B01D 50/20*** | (2022.01) |
| ***B05B 16/20*** | (2018.01) |
| ***B05B 16/60*** | (2018.01) |

(52) U.S. Cl.

CPC .............. *F26B 21/30* (2026.01); *B01D 50/20* (2022.01); *B05B 16/20* (2018.02); *B05B 16/60* (2018.02); *F26B 2210/12* (2013.01)

(58) Field of Classification Search

CPC ...... F26B 21/06; F26B 2210/12; B05B 16/20; B05B 16/60; B01D 50/20; B01D 45/08

See application file for complete search history.

(56) References Cited

U.S. PATENT DOCUMENTS

| | | | | |
|---|---|---|---|---|
| 4,297,116 | A * | 10/1981 | Cusick | B01D 46/0031 55/528 |
| 2023/0038492 | A1* | 2/2023 | Kobayashi | B05B 14/43 |

FOREIGN PATENT DOCUMENTS

| | | | | |
|---|---|---|---|---|
| CN | 108148643 | A * | 6/2018 | B01D 46/62 |
| JP | 4616091 | B2 | 1/2011 | |
| WO | WO-2008093539 | A1 * | 8/2008 | B05B 14/46 |

* cited by examiner

*Primary Examiner* — Robert Clemente

(74) *Attorney, Agent, or Firm* — Slater Matsil, LLP

(57) ABSTRACT

A volatile organic compound (VOC) removal system for removing VOC generated during a painting process of a vehicle body includes a paint spraying booth where paint is applied to the vehicle body, a paint baking oven for fixing the paint on the vehicle body applied with the paint in the paint spraying booth, an integration chamber for receiving a booth discharge gas from the paint spraying booth through a booth gas inflow line, to receive an oven discharge gas from the paint baking oven through an oven gas inflow line, and to form a mixture gas by mixing the received booth discharge gas and the received oven discharge gas, a VOC concentrator for forming a process gas by concentrating the mixture gas supplied from the integration chamber to increase a VOC concentration, and a VOC removing apparatus for removing VOC from the process gas supplied from the VOC concentrator.

20 Claims, 7 Drawing Sheets

INTEGRATION CHAMBER FOR MIXING BOOTH DISCHARGE GAS AND OVEN DISCHARGE GAS AND VOC REMOVAL SYSTEM UTILIZING THE SAME

CROSS-REFERENCE TO RELATED APPLICATIONS

This application claims priority to and the benefit of Korean Patent Application No. 10-2022-0042993, filed in the Korean Intellectual Property Office on Apr. 6, 2022, the entire contents of which are incorporated herein by reference.

TECHNICAL FIELD

The present disclosure relates to an integration chamber for mixing a booth discharge gas and an oven discharge gas and a VOC removal system utilizing the same.

BACKGROUND

In general, a vehicle body is subjected to a painting process in the process of manufacturing the vehicle. In the painting process, a paint spraying booth for applying a paint to the vehicle body and a paint baking oven for fixing the painted material to the vehicle body are provided.

During processing in the paint spraying booth and the paint baking oven, large amounts of volatile organic compounds (hereinafter referred to as "VOCs") may be generated. In order to prevent these VOCs from being emitted to the outside, a VOC removing apparatus for treating VOCs generated in the painting process is provided in the painting line, and the VOC removing apparatus is configured to remove VOCs from the discharge gas discharged from the paint spraying booth and the paint baking oven.

Since the discharge gas discharged from the paint spraying booth and the paint baking oven is large, the operation of the VOC removing apparatus may have to be performed with respect to the large amount of discharge gas.

In this case, when a VOC concentrator for increasing a VOC concentration of discharge gas is provided at an upstream side of the VOC removing apparatus to concentrate the discharge gas discharged from the paint spraying booth and the paint baking oven such that the amount of the process gas flowing into the VOC removing apparatus is reduced, the processing efficiency of the VOC removing apparatus may be improved and the amount of energy consumed for the VOC processing may be reduced. For example, when the VOC removing apparatus includes a regenerative thermal oxidizer (hereinafter referred to as "RTO"), heat is applied to oxidize (for example, burn) the VOCs. Therefore, when the amount of the process gas of the VOC removing apparatus is reduced, the amount of energy required for the processing is reduced accordingly.

Meanwhile, in general, the VOC concentrator is provided with an absorption/desorption element such as zeolite, and may concentrate the VOC of the discharge gas by using the VOC adsorption/desorption property according to the temperature of the adsorption/desorption element.

However, in general, the adsorption/desorption element provided in the VOC concentrator is sensitive to temperature, and there is a limitation in the temperature range of the gas introduced therein.

Therefore, conventionally, the VOCs are removed from the discharge gas discharged from the paint spraying booth and the paint baking oven, in separate lines. For example, a VOC removing apparatus for the paint spraying booth and a VOC removing apparatus for the paint baking oven are separately operated, or the VOC concentrator is only applied to the discharge gas discharged from the paint spraying booth.

The above information disclosed in this background section is only for enhancement of understanding of the background of the invention, and therefore it may contain information that does not form the prior art that is already known to a person of ordinary skill in the art.

SUMMARY

The present disclosure provides an integration chamber configured to mix a booth discharge gas and an oven discharge gas in an integration chamber, and a VOC removal system utilizing the same.

An exemplary integration chamber may be used in a volatile organic compound (VOC) removal system for removing VOC generated in a painting process of a vehicle body. The integration chamber includes a booth gas inflow line into which a booth discharge gas flows from a paint spraying booth, an oven gas inflow line into which an oven discharge gas flows from a paint baking oven, a mixing portion configured to form a mixture gas by mixing the booth discharge gas and the oven discharge gas, a separating portion configured to separate a liquified VOC from the mixture gas having passed through the mixing portion, and a filter portion configured to filter a foreign substance from the mixture gas having passed through the separating portion.

The oven gas inflow line may be connected to an interior of the booth gas inflow line to form an integrated line. The integrated line may be formed at an upstream side of the mixing portion such that the booth gas inflow line surrounds the oven gas inflow line.

The integrated line may be connected to the mixing portion, on an upper surface or a side surface of the mixing portion.

The mixing portion may include a vortex generator formed at an end of the integrated line.

The separating portion may include a drain portion configured to discharge the liquified VOC.

The separating portion may include a vertical plate configured to block the liquified VOC from moving to the filter portion.

The vertical plate may be formed such that an upper end is inclined toward an upstream side.

The separating portion may include a pre-chamber in which the mixture gas vertically moves, and a main chamber through which the mixture gas horizontally pass through at a downstream side of the pre-chamber, where the pre-chamber may include a horizontal plate horizontally formed in the pre-chamber, and the vertical plate is vertically formed in the main chamber.

The filter portion may include a plurality of filters disposed in series in a flowing direction of the mixture gas.

An exemplary volatile organic compound (VOC) removal system is for removing VOC generated during a painting process of a vehicle body. The VOC removal system includes a paint spraying booth where paint is applied to the vehicle body, a paint baking oven configured to fix the paint on the vehicle body applied with the paint in the paint spraying booth, an integration chamber configured to receive a booth discharge gas from the paint spraying booth through a booth gas inflow line, to receive an oven discharge gas from the paint baking oven through an oven gas inflow line, and to form a mixture gas by mixing the received booth discharge gas and the received oven discharge gas, a VOC concentrator configured to form a process gas by concentrating the mixture gas supplied from the integration chamber to increase a VOC concentration, and a VOC removing apparatus configured to remove VOC from the process gas supplied from the VOC concentrator.

The oven gas inflow line may be connected to an interior of the booth gas inflow line to form an integrated line. The integrated line may be formed at an upstream side of the integration chamber such that the booth gas inflow line surrounds the oven gas inflow line.

The integration chamber may be configured to separate a liquified VOC from the mixture gas and discharge the liquified VOC.

The integration chamber may be the integration chamber according to an embodiment of the present disclosure.

The VOC removal system may further include a booth gas exhaust line connected to the booth gas inflow line, and configured to exhaust the booth discharge gas from the booth gas inflow line to an atmosphere, a booth gas exhaust adjustment valve disposed on the booth gas exhaust line, and configured to adjust an amount of the booth discharge gas flowing through the booth gas exhaust line, a booth gas inflow line valve disposed on the booth gas inflow line, and configured to adjust an amount of the booth discharge gas flowing through the booth gas inflow line, and an oven gas inflow line valve disposed on the oven gas inflow line, and configured to adjust an amount of the oven discharge gas flowing through the oven gas inflow line.

Before the vehicle body is put into the paint spraying booth, the booth gas exhaust adjustment valve may be opened and the booth gas inflow line valve may be closed, thereby, exhausting an air within the paint spraying booth to an atmosphere. In addition, the oven gas inflow line valve may be closed, such that an air within the paint baking oven is circulated in the paint baking oven to be preheated. In addition, the VOC removing apparatus may be preheated.

When the vehicle body is put into the paint spraying booth to be painted and the vehicle body is not yet put into the paint baking oven, the booth gas exhaust adjustment valve may be closed and the booth gas inflow line valve may be opened, such that the booth discharge gas is supplied to the integration chamber. In addition, the oven gas inflow line valve may be closed, such that an air within the paint baking oven is circulated in the paint baking oven to be preheated. In addition, the integration chamber may supply the booth discharge gas to the VOC concentrator as the mixture gas. In addition, the VOC concentrator may concentrate the supplied mixture gas, and supply the concentrated process gas to the VOC removing apparatus. In addition, the VOC removing apparatus removes the VOC from the process gas.

When the vehicle body having passed through the paint spraying booth is put into the paint baking oven, the booth gas exhaust adjustment valve may be closed and the booth gas inflow line valve may be opened, such that the booth discharge gas is supplied to the integration chamber. In addition, the oven gas inflow line valve may be opened, such that the oven discharge gas is supplied to the integration chamber. In addition, the integration chamber may mix the booth discharge gas and the oven discharge gas, and supply the mixture gas to the VOC concentrator. In addition, the VOC concentrator may concentrate the supplied mixture gas, and supply the concentrated process gas to the VOC removing apparatus. The VOC removing apparatus removes the VOC from the process gas.

The VOC removal system may further include an ambient air inflow line connected to the booth gas inflow line at a location downstream to the booth gas adjustment valve, and configured to transport an ambient air to the booth gas inflow line, and an ambient air amount adjustment valve disposed on the ambient air inflow line, and configured to adjust an amount of the ambient air flowing into the booth gas inflow line from atmosphere. Here, when the vehicle body is discharged from the paint baking oven, the booth gas exhaust adjustment valve may be closed and the booth gas inflow line valve is closed, such that the booth discharge gas is blocked. In addition, the oven gas inflow line valve may be opened, such that the oven discharge gas is supplied to the integration chamber. In addition, the ambient air amount adjustment valve may be opened, such that the ambient air is supplied to the integration chamber. In addition, the integration chamber may mix the ambient air and the oven discharge gas, and supply the mixture gas to the VOC concentrator. In addition, the VOC concentrator may concentrate the supplied mixture gas, and supply the concentrated process gas to the VOC removing apparatus. In addition, the VOC removing apparatus may remove the VOC from the process gas.

The VOC removal system may further include a temperature sensor configured to detect a temperature the mixture gas discharged from the integration chamber, where when the vehicle body is discharged from the paint baking oven, and the ambient air amount adjustment valve is adjusted to adjust an amount of the ambient air flowing through the ambient air inflow line, such that the temperature of the mixture gas detected by the temperature sensor is constant.

According to an integration chamber according to an embodiment, the liquified VOC formed while forming the mixture gas may be separately discharged, and thereby, the processing loads of the VOC concentrator and the VOC removing apparatus may be decreased.

According to VOC removal system using an integration chamber according to an embodiment, discharge gases discharged from both the paint baking oven and the paint spraying booth may be simultaneously treated. In addition, the oven discharge gas of the paint baking oven may be concentrated, and thereby the VOC removal efficiency may be improved.

Other effects that may be obtained or are predicted by an embodiment will be explicitly or implicitly described in a detailed description of the present disclosure. That is, various effects that are predicted according to an exemplary embodiment will be described in the following detailed description.

DETAILED DESCRIPTION OF ILLUSTRATIVE EMBODIMENTS

Figure 1:
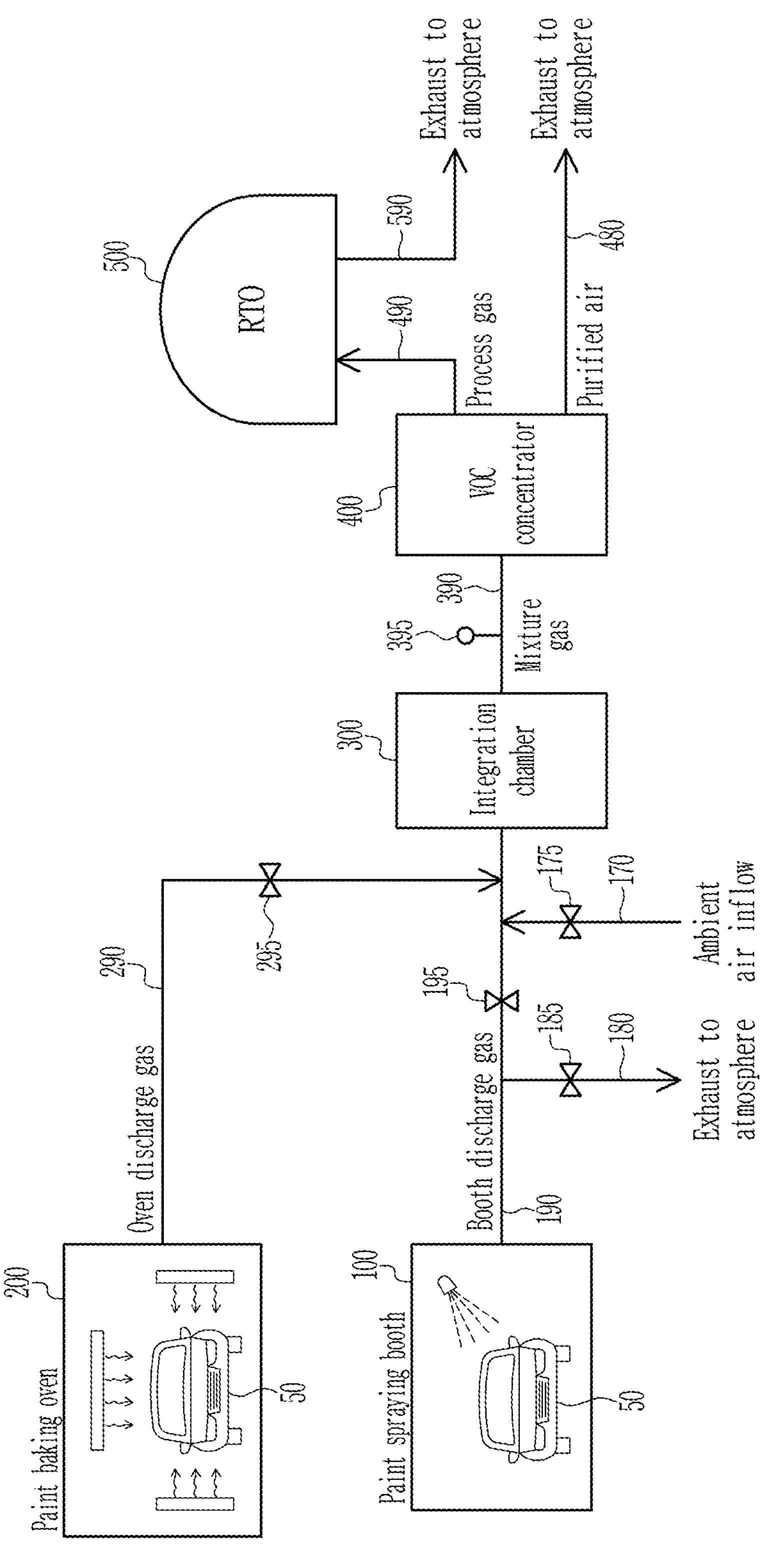
FIG. 1 is a schematic diagram of a VOC removal system according to an embodiment.

Hereinafter, exemplary embodiments disclosed in the present specification will be described in detail with reference to the accompanying drawings. In the present specification, the same or similar components will be denoted by the same or similar reference numerals, and a repeated description thereof will be omitted.

In describing exemplary embodiments of the present specification, when it is determined that a detailed description of the well-known art associated with the present invention may obscure the gist of the present invention, it will be omitted. The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

Terms "unit", "part" or "portion", "-er", and "module" for components used in the following description are used only in order to easily describe the specification. Therefore, these terms do not have meanings or roles that distinguish them from each other in and of themselves. In addition, the terms "unit", "part" or "portion", "-er", and "module" in the specification refer to a unit that processes at least one function or operation, which may be implemented by hardware, software, or a combination of hardware and software.

As used herein, the singular forms are intended to include the plural forms as well, unless the context clearly indicates otherwise. As used herein, the term "and/or" includes any one or all combinations of one or more related items.

An exemplary embodiment is hereinafter described in detail with reference to the drawings.

FIG. 1 is a schematic diagram of a VOC removal system according to an embodiment.

A VOC removal system according to an embodiment is configured to remove a volatile organic compound (VOC) generated during a painting process of a vehicle body 50.

As shown in FIG. 1, a VOC removal system according to an embodiment includes a paint spraying booth 100, a paint baking oven 200, an integration chamber 300, a VOC concentrator 400, and a VOC removing apparatus 500.

In the paint spraying booth 100, paint is applied to the vehicle body 50.

The paint baking oven 200 is configured to fix the paint on the vehicle body 50 applied with the paint in the paint spraying booth 100.

The integration chamber 300 is configured to receive a booth discharge gas from the paint spraying booth 100 through a booth gas inflow line 190, to receive an oven discharge gas from the paint baking oven 200 through an oven gas inflow line 290, and to form a mixture gas by mixing the received booth discharge gas and the received oven discharge gas.

The VOC concentrator 400 is configured to form a process gas by concentrating the mixture gas supplied from the integration chamber 300 to increase a VOC concentration.

The VOC removing apparatus 500 is configured to remove VOC from the process gas supplied from the VOC concentrator 400.

The VOC removing apparatus 500 may include a regenerative thermal oxidizer (hereinafter called "RTO"), or additionally or alternatively, may include a regenerative catalytic oxidizer (RCO). FIG. 1 illustrates an RTO merely for purposes of illustration, and it should be understood that the scope of the present disclosure is not limited thereto.

As shown in FIG. 1, a VOC removal system according to an embodiment further includes a booth gas exhaust line 180, a booth gas exhaust adjustment valve 185, a booth gas inflow line valve 195, an oven gas inflow line valve 295, an ambient air inflow line 170, and an ambient air amount adjustment valve 175.

The booth gas exhaust line 180 is connected to the booth gas inflow line 190, and configured to exhaust the booth discharge gas from the booth gas inflow line 190 to an atmosphere.

The booth gas exhaust adjustment valve 185 is disposed on the booth gas exhaust line 180, and configured to adjust an amount of the booth discharge gas flowing through the booth gas exhaust line 180.

The booth gas inflow line valve 195 is disposed on the booth gas inflow line 190, and configured to adjust an amount of the booth discharge gas flowing through the booth gas inflow line 190.

The oven gas inflow line valve 295 is disposed on the oven gas inflow line 290, and configured to adjust an amount of the oven discharge gas flowing through the oven gas inflow line 290.

The ambient air inflow line 170 is connected to the booth gas inflow line 190 at a location downstream to the booth gas inflow line valve 195, and configured to transport an ambient air to the booth gas inflow line 190.

The ambient air amount adjustment valve 175 is disposed on the ambient air inflow line 170, and configured to adjust an amount of the ambient air flowing into the booth gas inflow line 190 from atmosphere.

In addition, as shown in FIG. 1, a VOC removal system according to an embodiment further includes: a mixture gas line 390 through which the mixture gas mixed in the integration chamber 300 is supplied to the VOC concentrator 400; a purified air exhaust line 480 configured to exhaust a purified air to an atmosphere in the process of the VOC concentration of the VOC concentrator 400; a process gas supply line 490 configured to supply the process gas, of which the VOCs are concentrated by the VOC concentrator 400, to the VOC removing apparatus 500; and a VOC-removed air exhaust line 590 configured to exhaust a VOC-removed air, formed by the VOC removing apparatus 500 by removing the VOCs, to an atmosphere.

In addition, a VOC removal system according to an embodiment further includes a temperature sensor 395 disposed on the mixture gas line 390, and configured to detect a temperature of the mixture gas discharged from the integration chamber 300.

Each of the above-mentioned lines is not limited to the material thereof, and may be formed of any material capable of flowing a corresponding gas without leakage.

In addition, in the present disclosure, each of specific valves disposed on specific lines to adjust the amount of gas flowing through the lines may be, for example, a valve that gradually adjusts the flow rate flowing through the line, and if applicable, may be formed as an on/off valve.

The oven gas inflow line 290 is connected to an interior of the booth gas inflow line 190 to form an integrated line 310. The integrated line 310 is formed at an upstream side of the integration chamber 300 such that the booth gas inflow line 190 surrounds the oven gas inflow line 290. The above feature is described in further detail below in connection with the integrated line 310.

In addition, the integration chamber 300 is configured to separate a liquified VOC from the mixture gas and discharge the liquified VOC, which is described in further detail below in connection with the integrated line 310.

Hereinafter, an integration chamber according to an embodiment 300 is described in detail with reference to accompanying drawings.

Figure 2:
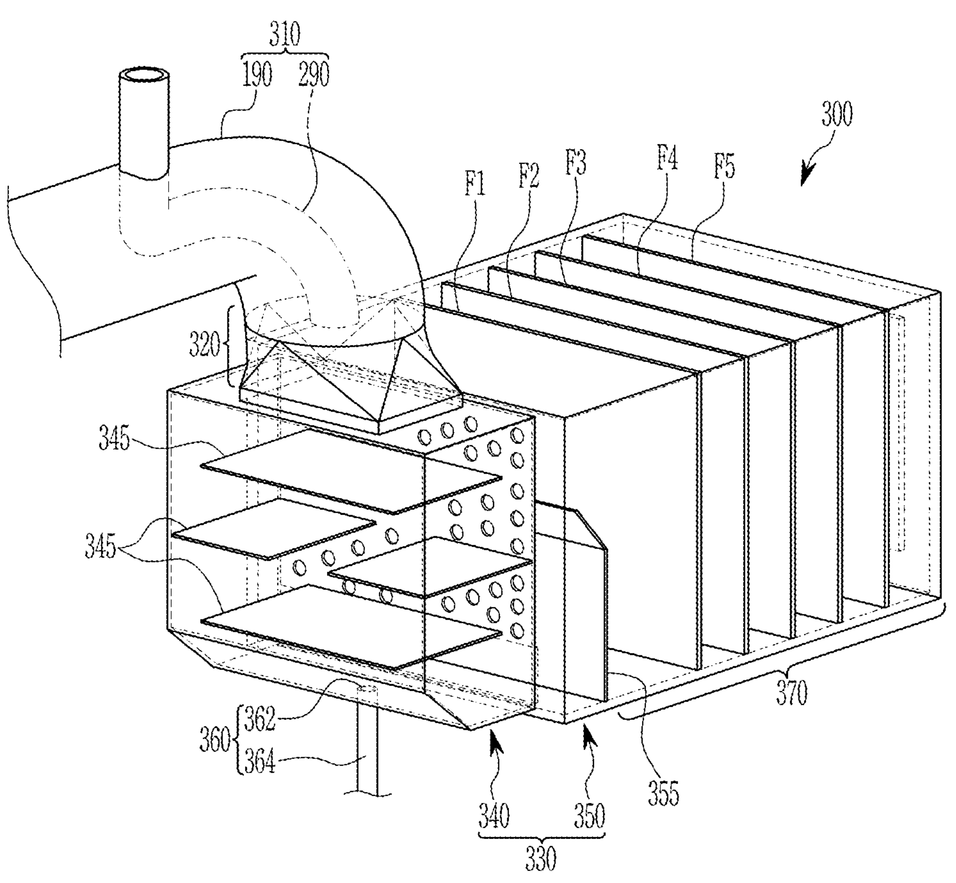
FIG. 2 is a schematic diagram of an integration chamber according to an embodiment.

FIG. 2 is a schematic diagram of an integration chamber according to an embodiment.

An integration chamber 300 according to an embodiment is an integration chamber that may be used in a VOC removal system for removing a volatile organic compound (VOC) generated in the painting process of the vehicle body.

As shown in FIG. 2, an integration chamber 300 according to an embodiment includes, the booth gas inflow line 190 into which the booth discharge gas flows from the paint spraying booth 100, the oven gas inflow line 290 into which the oven discharge gas flows from the paint baking oven 200, a mixing portion 320 configured to form the mixture gas by mixing the booth discharge gas and the oven discharge gas, a separating portion 330 configured to separate the liquified VOC from the mixture gas having passed through the mixing portion 320, and a filter portion 370 configured to filter a foreign substance from the mixture gas having passed through the separating portion 330. The process gas, which has been filtered out of foreign substances by the filter portion 370 is discharged from the integration chamber 300 and supplied to the VOC concentrator 400.

The oven gas inflow line 290 is connected to the interior of the booth gas inflow line 190 to form the integrated line 310. The integrated line 310 is formed at an upstream side of the mixing portion 320 such that the booth gas inflow line 190 surrounds the oven gas inflow line 290. That is, the oven gas inflow line 290 through which the oven discharge gas having a low volume and a high temperature flows is surrounded by the booth gas inflow line 190 through which the booth discharge gas having a high volume and a low temperature flows.

According to such a line integration structure of the integrated line 310, while the oven discharge gas having the low volume and the high temperature passes through the integrated line 310, the oven discharge gas may be cooled through a heat-exchange with the booth discharge gas passing through the booth gas inflow line 190 surrounding the oven gas inflow line 290. Therefore, the oven discharge gas having the high temperature may be primarily cooled while passing through the integrated line 310.

Meanwhile, in general, the amount of the booth discharge gas is larger than the amount of the oven discharge gas. At this time, the above structure of the integrated line 310 is advantageous to form a diameter of the booth gas inflow line 190 through which the booth discharge gas passes to be larger than a diameter of the oven gas inflow line 290 through which the oven discharge gas passes, to correspond to the different amounts of gases. Therefore, the oven discharge gas and the booth discharge gas may be stably flow through the corresponding lines.

Figure 7:
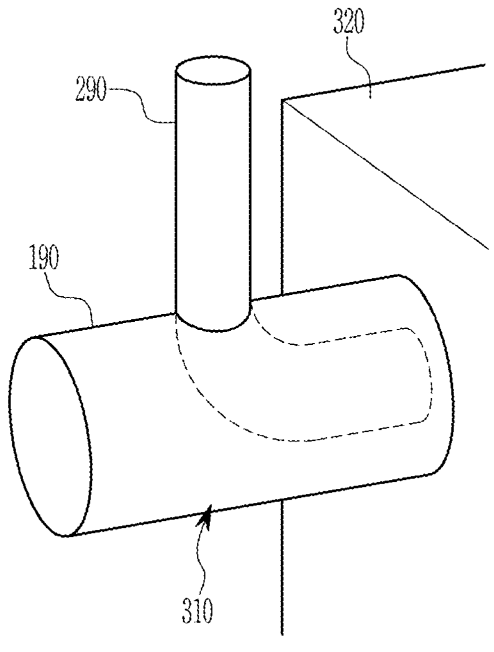
FIG. 7 illustrates an exemplary variation of an integrated line and a mixing portion of an integration chamber according to an embodiment.

The integrated line 310 may be connected to the mixing portion 320, on an upper surface or a side surface of the mixing portion 320. For example, as shown in FIG. 2, the integrated line 310 may be connected to the mixing portion 320, on an upper surface of the mixing portion 320. For another example, as shown in FIG. 7, the integrated line 310 may be connected to the mixing portion 320, on a side surface of the mixing portion 320.

According to such a connection scheme, liquified/condensed substances (e.g., the liquified VOC) that may be generated while the oven discharge gas passes through the integrated line 310 may be prevented from accumulated in the line, and may be stably supplied to the separating portion 330.

Figure 3:
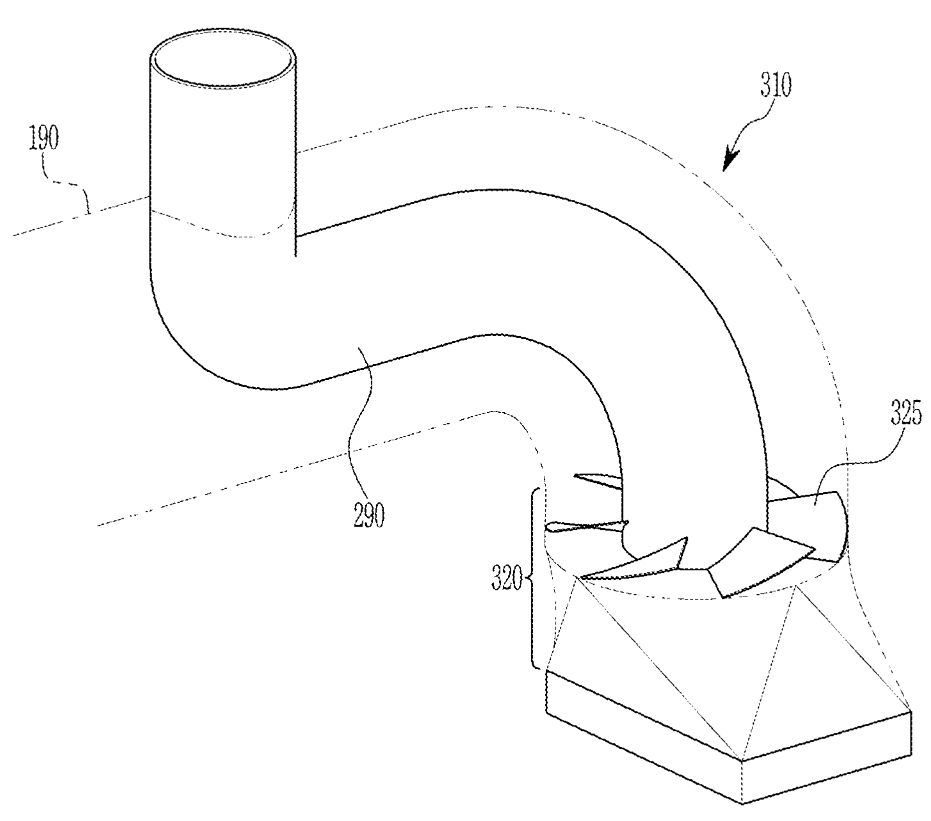
FIG. 3 illustrates a mixing portion of an integration chamber according to an embodiment.

FIG. 3 illustrates a mixing portion of an integration chamber according to an embodiment.

As shown in FIG. 3, the mixing portion 320 may include a vortex generator 325 formed at an end of the integrated line 310. The vortex generator 325 functions to better mix the booth discharge gas exiting the booth gas inflow line 190 and the oven discharge gas exiting the oven gas inflow line 290, and accordingly, the performance of mixing the oven discharge gas and the booth discharge gas, and the effect of the heat-exchange therebetween may be maximized, thereby maximizing the effect of cooling the oven discharge gas.

For example, FIG. 3 shows a vortex generator in the form of a fan, in which each blade may connect an exterior circumference of the oven gas inflow line 290 and an interior circumference of the booth gas inflow line 190. Accordingly, the oven gas inflow line 290 forming an interior line and the booth gas inflow line 190 forming an exterior line may be more firmly connected.

Meanwhile, although it is illustrated in the drawing that the mixing portion 320 and the separating portion 330 are formed as separate spaces, it should be understood that the scope of the present disclosure is not limited thereto. For example, the mixing portion 320 and the separating portion 330 may be integrated as a single space.

Figure 4:
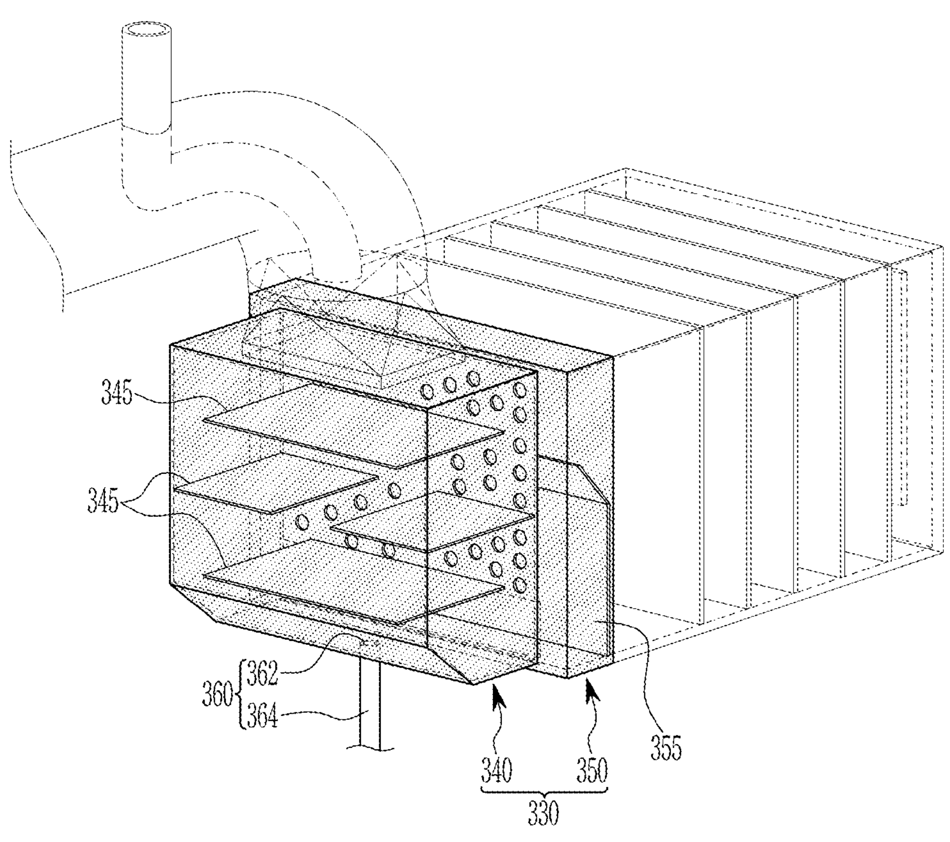
FIG. 4 is a drawing that emphasizes a separating portion in an integration chamber according to an embodiment.

FIG. 4 is a drawing that emphasizes a separating portion in an integration chamber according to an embodiment.

As described above, the separating portion 330 performs a function to separate the liquified VOC from the mixture gas having passed through the mixing portion 320. The temperature of the oven discharge gas is lowered through the heat-exchange with the booth discharge gas passing through the booth gas inflow line 190 while passing through the oven gas inflow line 290 within the integrated line 310, and by direct mixing with the booth discharge gas in the mixing portion 320. Accordingly, the VOCs contained in the oven discharge gas may be liquified. Therefore, in an embodiment, it is attempted to separate and discharge the liquified VOC by the separating portion 330.

As shown in FIG. 4, the separating portion 330 according to an embodiment includes a pre-chamber 340 in which the mixture gas vertically moves and a main chamber 350 through which the mixture gas horizontally pass through at a downstream side of the pre-chamber 340.

The pre-chamber 340 includes a horizontal plate 345 horizontally formed in the pre-chamber 340.

The mixture gas is primarily mixed while passing through the mixing portion 320 and flows into the pre-chamber 340. Then, the mixture gas vertically moves in the pre-chamber 340, and in this process, the mixture gas is further mixed while colliding with the horizontal plate 345. During this process, the liquified VOC may be further generated.

The generated liquified VOC flows downward by gravity, and a drain portion 360 configured to exhaust the liquified VOC is provided in the separating portion 330. For example, the drain portion 360 may include a drain hole 362 formed on a bottom surface of the separating portion 330 and a drain line 364 connected to the drain hole 362.

In an example, a porous plate formed with a plurality of pores (i.e., holes) may be disposed between the pre-chamber 340 and the main chamber 350, and the horizontal plate 345 may be fixed to the porous plate. In addition, the mixture gas in a gas state from which the liquified VOC is separated may move to the main chamber 350 through the porous plate.

The main chamber 350 includes a vertical plate 355 vertically formed in the main chamber 350. The vertical plate 355 is configured to block the liquified VOC from moving to the filter portion 370.

As shown in FIG. 2 and FIG. 4, the vertical plate 355 may be formed such that an upper end is inclined toward an upstream side, and thereby the liquified VOC condensed on a lower portion of the main chamber 350 may be effectively blocked from moving to the filter portion 370 (e.g., by fluctuating due to flow wind).

In the above description, it has been described that the separating portion 330 is divided into the pre-chamber 340 and the main chamber 350, however, it should be understood that the scope of the present disclosure is not limited thereto.

It is a mere example that the separating portion 330 may have divisions of the pre-chamber 340 and the main chamber 350 when the capacity of the integration chamber 300 is large, that is, when a large amount of gas is to be processed. To the contrary, when the capacity of the integration chamber 300 is small, that is, a small amount of gas is to be processed, it may be understood that the separating portion 330 may be formed as a single chamber since mixing of the oven discharge gas is easy.

The mixture gas having passed through the separating portion 330 moves to the filter portion 370.

Figure 5:
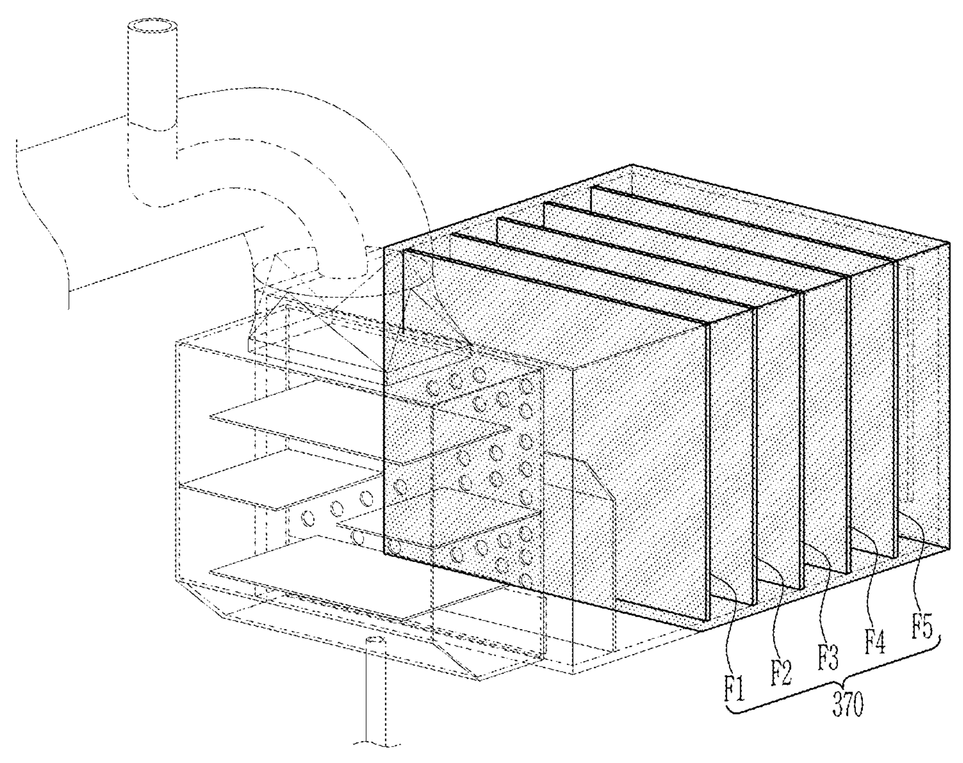
FIG. 5 is a drawing that emphasizes a filter portion in an integration chamber according to an embodiment.

FIG. 5 is a drawing that emphasizes a filter portion in an integration chamber according to an embodiment.

As described above, the filter portion 370 is configured to filter foreign substances from the mixture gas having passed through the separating portion 330, and includes a plurality of filters $F_1$, $F_2$, $F_3$, $F_4$, and $F_5$ disposed in series in a flowing direction of the mixture gas.

The frontmost first filter $F_1$ is a pre-filter, and may be configured to filter liquified high boiling point compounds. The first filter $F_1$ among the plurality of filters has a highest load, and may be required to be replaced frequently (e.g., replaced every 1 to 2 weeks), and a roll-type may be applied for replacement convenience.

The filters $F_2$ to $F_5$ downstream to the first filter $F_1$ may be implemented in various forms, such as a bag filter, a HEPA filter, and the like, to be appropriate for the amount of foreign substances intended to be filtered. In addition, the rearmost filter may be implemented as, for example, a carbon filter, to filter high boiling point compounds that are not liquified.

Although the drawings illustrate five multi-staged filters of the first filter $F_1$ and the second to fifth filters ($F_2$ to $F_5$), it should not be understood that the scope of the present disclosure is limited thereto.

Hereinafter, an operation of a VOC removal system according to an embodiment is described in detail.

Figure 6:
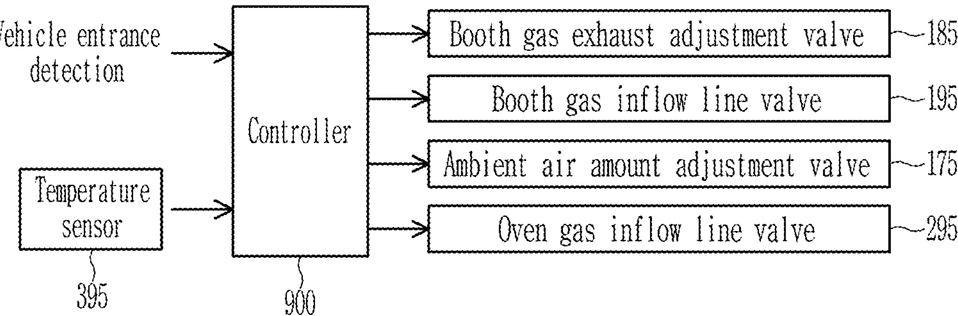
FIG. 6 is a block diagram showing a control configuration of a VOC removal system according to an embodiment.

FIG. 6 is a block diagram showing a control configuration of a VOC removal system according to an embodiment.

A controller 900 detects whether the vehicle body 50 enters the paint spraying booth 100 and/or the paint baking oven 200, detects the temperature of the mixture gas discharged from the integration chamber 300 by the temperature sensor 395, and based on the detection, controls above-described valves (i.e., the booth gas exhaust adjustment valve 185, the booth gas inflow line valve 195, the oven gas inflow line valve 295, and the ambient air amount adjustment valve 175).

Whether the vehicle body 50 enters the paint spraying booth 100 and/or the paint baking oven 200 may be determined according to various methods, for example, based on a vehicle body entrance signal from the paint spraying booth 100 and/or the paint baking oven 200, and for another example, based on whether discharge fan of the paint spraying booth 100 and/or the paint baking oven 200 is operated. The scope of the present disclosure is not limited to a specific method.

The controller 900 may be implemented as one or more microprocessors operated by a preset program, and the preset program may include a series of instructions for performing an operation according to a condition to be described later.

As an embodiment, the controller 900 may perform the VOC removal procedure in the steps shown in Table 1 below, and the operation in each step will be described in detail below.

TABLE 1

| | booth gas exhaust adjustment valve | booth gas inflow line valve | oven gas inflow line valve | ambient air amount adjustment valve |
|---|---|---|---|---|
| painting preparation | Open | Closed | Closed | Closed |
| painting initiation | Closed | Open | Closed | Closed |
| painting processing | Closed | Open | Open | Closed |
| painting finish | Closed | Closed | Open | Open |

1. Painting Preparation Stage

The painting preparation stage is a stage for preparing the VOC removal system, before the vehicle body 50 is put into the paint spraying booth 100.

In the painting preparation stage, by the controller 900, the booth gas exhaust adjustment valve 185 is opened, and the booth gas inflow line valve 195 is closed, and accordingly, thereby exhausting an air within the paint spraying booth 100 to the atmosphere. In addition, the oven gas inflow line valve 295 is closed, such that the air within the paint baking oven 200 is circulated in the paint baking oven 200 to be preheated. In addition, the VOC removing apparatus 500 is preheated.

That is, since VOCs are not generated before the vehicle body 50 to be painted is put into the paint spraying booth 100, the air within the paint spraying booth 100 may be exhausted to an atmosphere, the air within the paint baking oven 200 may be preheated through internal circulation, and an air within the VOC removing apparatus 500 may be preheated through internal circulation. Accordingly, the VOC removal system may be prepared to process the VOCs as soon as the VOCs are generated when the vehicle body 50 is put into the paint spraying booth 100.

2. Painting Initiation Stage

The painting initiation stage is a process stage for a situation that the vehicle body 50 is put into the paint spraying booth 100 to be painted, and the vehicle body 50 is not yet put into the paint baking oven 200.

In the painting initiation stage, by the controller 900, the booth gas exhaust adjustment valve 185 is closed, the booth gas inflow line valve 195 is opened, and accordingly, the booth discharge gas is supplied to the integration chamber 300. In addition, the oven gas inflow line valve 295 is closed, such that the air within the paint baking oven 200 is circulated in the paint baking oven 200 to be preheated.

The integration chamber 300 supplies the booth discharge gas to the VOC concentrator 400 as the mixture gas. The VOC concentrator 400 concentrates the supplied mixture gas, and supplies the concentrated process gas to the VOC removing apparatus 500. Accordingly, the VOC removing apparatus 500 removes VOCs from the process gas, and exhausts the VOC-removed air to an atmosphere through the VOC-removed air exhaust line 590.

In the painting initiation stage, since the vehicle body 50 only exists in the paint spraying booth 100, the booth discharge gas from the paint spraying booth 100 is processed by the VOC concentrator 400, and the paint baking oven 200 is maintained to be preheated to quickly function as the vehicle body 50 applied with the paint enters.

3. Painting Processing Stage

The painting processing stage is a process stage for a situation that the vehicle body 50 having passed through the paint spraying booth 100 is put into the paint baking oven 200. In this case, a new vehicle body 50 may have been put into the paint spraying booth 100.

In the painting processing stage, by the controller 900, the booth gas exhaust adjustment valve 185 is closed and the booth gas inflow line valve 195 is opened, such that the booth discharge gas is supplied to the integration chamber 300. In addition, the oven gas inflow line valve 295 is opened, such that the oven discharge gas is supplied to the integration chamber 300.

The integration chamber 300 mixes the booth discharge gas and the oven discharge gas, and supplies the mixture gas to the VOC concentrator 400. The VOC concentrator 400 concentrate the supplied mixture gas, and supplies the concentrated process gas to the VOC removing apparatus 500. Accordingly, the VOC removing apparatus 500 removes VOCs from the process gas, and exhausts the VOC-removed air to an atmosphere through the VOC-removed air exhaust line 590.

In the painting processing stage, the booth discharge gas from the paint spraying booth 100 and the oven discharge gas from the paint baking oven 200 may be simultaneously concentrated in the VOC concentrator 400. Therefore, a VOC removal efficiency is improved.

4. Painting Finish Stage

The painting finish stage is a stage for a situation that the vehicle body 50 is discharged from the paint baking oven 200 and the painting process is being finished. It may be understood that, even if the vehicle body 50 is discharged from the paint baking oven 200, discharging of an internal air within the paint baking oven 200 is not immediately stopped, and VOCs in the air remaining in the paint baking oven 200 needs to be removed.

In the painting finish stage, by the controller 900, the booth gas exhaust adjustment valve 185 is closed and the booth gas inflow line valve 195 is closed, such that the booth discharge gas is blocked. In addition, the oven gas inflow line valve 295 is opened, such that the oven discharge gas is supplied to the integration chamber 300. In addition, the ambient air amount adjustment valve 175 is opened, such that the ambient air is supplied to the integration chamber 300.

Therefore, the integration chamber 300 mixes the ambient air and the oven discharge gas, and supplies the mixture gas to the VOC concentrator 400. The VOC concentrator 400 concentrate the supplied mixture gas, and supplies the concentrated process gas to the VOC removing apparatus 500. Accordingly, the VOC removing apparatus 500 removes the VOC from the process gas.

In the painting finish stage, the oven discharge gas from the paint baking oven 200 is mixed with the ambient air instead of the booth discharge gas to form the mixture gas, and accordingly, the oven discharge gas may be continuously treated to remove VOCs.

Meanwhile, in the painting finish stage, by the controller 900, the ambient air amount adjustment valve 175 may be adjusted to adjust an amount of the ambient air flowing through the ambient air inflow line 170, such that the temperature of the mixture gas detected by the temperature sensor 395 is constant.

According to an integration chamber according to an embodiment, the gas flowing into the oven gas inflow line 290 is mixed with the gas flowing into the booth gas inflow line, and thereby, the mixture gas of a temperature appropriate for the treatment of the VOC concentrator may be supplied to the VOC concentrator.

According to an integration chamber according to an embodiment, the liquified VOC formed while forming the mixture gas may be separately discharged, and thereby, the processing loads of the VOC concentrator and the VOC removing apparatus may be decreased.

According to VOC removal system using an integration chamber according to an embodiment, discharge gases discharged from both the paint baking oven and the paint spraying booth may be simultaneously treated. In addition, the oven discharge gas of the paint baking oven may be concentrated, and thereby the VOC removal efficiency may be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An integration chamber used in a volatile organic compound (VOC) removal system for removing VOC generated in a painting process of a vehicle body, the integration chamber comprising:

a booth gas inflow line into which a booth discharge gas flows from a paint spraying booth;

an oven gas inflow line into which an oven discharge gas flows from a paint baking oven, wherein the oven gas inflow line is connected to an interior of the booth gas inflow line to form an integrated line;

a mixing portion configured to form a mixture gas by mixing the booth discharge gas and the oven discharge gas, wherein the integrated line is arranged at an upstream side of the mixing portion such that the booth gas inflow line surrounds the oven gas inflow line, and wherein the mixing portion comprises a vortex generator at an end of the integrated line;

a separating portion configured to separate a liquified VOC from the mixture gas having passed through the mixing portion; and a filter portion configured to filter a foreign substance from the mixture gas having passed through the separating portion.

2. The integration chamber of claim 1, wherein the integrated line is connected to the mixing portion on an upper surface or a side surface of the mixing portion.

3. The integration chamber of claim 1, wherein the separating portion comprises a drain portion configured to discharge the liquified VOC.

4. The integration chamber of claim 3, wherein the separating portion comprises a vertical plate configured to block the liquified VOC from moving to the filter portion.

5. The integration chamber of claim 4, wherein the vertical plate has an upper end inclined toward the upstream side.

6. The integration chamber of claim 4, wherein the separating portion comprises:

a pre-chamber configured to have the mixture gas move vertically; and a main chamber configured to have the mixture gas horizontally pass through at a downstream side of the pre-chamber, wherein the pre-chamber comprises a horizontal plate horizontally disposed in the pre-chamber, and the vertical plate is vertically disposed in the main chamber.

7. The integration chamber of claim 1, wherein the filter portion comprises a plurality of filters disposed in series in a flowing direction of the mixture gas.

8. A volatile organic compound (VOC) removal system, the VOC removal system comprising:

a paint spraying booth configured to apply paint to a vehicle body;

a paint baking oven configured to fix the applied paint on the vehicle body;

an integration chamber comprising:

a booth gas inflow line configured to receive a booth discharge gas flowing from the paint spraying booth;

an oven gas inflow line configured to receive an oven discharge gas flowing from the paint baking oven;

a mixing portion configured to form a mixture gas by mixing the booth discharge gas and the oven discharge gas;

a separating portion configured to separate a liquified VOC from the mixture gas having passed through the mixing portion; and a filter portion configured to filter a foreign substance from the mixture gas having passed through the separating portion;

a VOC concentrator configured to form a process gas by concentrating the mixture gas supplied from the integration chamber to increase a VOC concentration; and a VOC removing apparatus configured to remove VOC from the process gas supplied from the VOC concentrator.

9. The VOC removal system of claim 8, further comprising:

a booth gas exhaust line connected to the booth gas inflow line, the booth gas exhaust line being configured to exhaust the booth discharge gas from the booth gas inflow line to an atmosphere;

a booth gas exhaust adjustment valve disposed on the booth gas exhaust line, the booth gas exhaust adjustment valve being configured to adjust an amount of the booth discharge gas flowing through the booth gas exhaust line;

a booth gas inflow line valve disposed on the booth gas inflow line, the booth gas inflow line valve being configured to adjust an amount of the booth discharge gas flowing through the booth gas inflow line; and an oven gas inflow line valve disposed on the oven gas inflow line, the oven gas inflow line valve being configured to adjust an amount of the oven discharge gas flowing through the oven gas inflow line.

10. The VOC removal system of claim 8, wherein the oven gas inflow line is connected to an interior of the booth gas inflow line to form an integrated line, the integrated line being formed at an upstream side of the mixing portion such that the booth gas inflow line surrounds the oven gas inflow line.

11. The VOC removal system of claim 10, wherein the integrated line is connected to the mixing portion on an upper surface or a side surface of the mixing portion.

12. The VOC removal system of claim 10, wherein the mixing portion comprises a vortex generator at an end of the integrated line.

13. The VOC removal system of claim 8, wherein the separating portion further comprises a drain portion configured to discharge the liquified VOC.

14. An integration chamber used in a volatile organic compound (VOC) removal system for removing VOC generated in a painting process of a vehicle body, the integration chamber comprising:

a booth gas inflow line into which a booth discharge gas flows from a paint spraying booth;

an oven gas inflow line into which an oven discharge gas flows from a paint baking oven;

a mixing portion configured to form a mixture gas by mixing the booth discharge gas and the oven discharge gas;

a separating portion configured to separate a liquified VOC from the mixture gas having passed through the mixing portion, wherein the separating portion comprises:

a pre-chamber configured to have the mixture gas move vertically, and comprising a horizontal plate horizontally disposed in the pre-chamber; and a main chamber configured to have the mixture gas horizontally pass through at a downstream side of the pre-chamber, and comprising a vertical plate vertically disposed in the main chamber; and a filter portion configured to filter a foreign substance from the mixture gas having passed through the separating portion, wherein the vertical plate of the main chamber is configured to block the liquified VOC from moving to the filter portion.

15. The integration chamber of claim 14, wherein the oven gas inflow line is connected to an interior of the booth gas inflow line to form an integrated line, the integrated line being formed at an upstream side of the mixing portion such that the booth gas inflow line surrounds the oven gas inflow line.

16. The integration chamber of claim 15, wherein the integrated line is connected to the mixing portion on an upper surface or a side surface of the mixing portion.

17. The integration chamber of claim 15, wherein the mixing portion comprises a vortex generator at an end of the integrated line.

18. The integration chamber of claim 14, wherein the separating portion further comprises a drain portion configured to discharge the liquified VOC.

19. The integration chamber of claim 14, wherein the vertical plate has an upper end inclined toward an upstream side.

20. The integration chamber of claim 14, wherein the filter portion comprises a plurality of filters disposed in series in a flowing direction of the mixture gas.

* * * * *